US009467526B2

(12) United States Patent
Hellyar et al.

(10) Patent No.: US 9,467,526 B2
(45) Date of Patent: Oct. 11, 2016

(54) NETWORK COMMUNICATION USING INTERMEDIATION PROCESSOR

(71) Applicant: Microsoft Technology Licensing, LLC, Redmond, WA (US)

(72) Inventors: Paul Stephen Hellyar, Kirkland, WA (US); Kye Hyun Kim, Bellevue, WA (US); Anthony Vincent Discolo, Sammamish, WA (US); Andres Vega-Garcia, Sammamish, WA (US); Chad Wesley Wahlin, Redmond, WA (US); Travis J. Muhlestein, Redmond, WA (US); Robert Unoki, Redmond, WA (US); Kenneth Michael Bayer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 14/156,330

(22) Filed: Jan. 15, 2014

(65) Prior Publication Data

US 2015/0201034 A1 Jul. 16, 2015

(51) Int. Cl.
*H04L 29/08* (2006.01)
*G06F 15/167* (2006.01)
*G06F 9/54* (2006.01)

(52) U.S. Cl.
CPC ........... *H04L 67/2842* (2013.01); *G06F 9/544* (2013.01); *G06F 15/167* (2013.01)

(58) Field of Classification Search
CPC .... G06F 15/167; G06F 9/544; H06I 67/2842
See application file for complete search history.

(56) References Cited

U.S. PATENT DOCUMENTS

| 5,845,130 | A | * | 12/1998 | Goff | G06F 15/167 710/240 |
| 8,205,029 | B2 | | 6/2012 | Shoemaker et al. | |
| 8,873,619 | B1 | * | 10/2014 | Hogan | H04N 19/00 375/240.01 |
| 2008/0259816 | A1 | * | 10/2008 | Archer | G06F 17/509 370/254 |
| 2011/0078249 | A1 | * | 3/2011 | Blocksome | G06F 9/544 709/206 |
| 2012/0084517 | A1 | | 4/2012 | Post et al. | |

(Continued)

OTHER PUBLICATIONS

International Search Report and Written Opinion Issued in PCT Application No. PCT/US2015/010546, Mailed Date: Mar. 13, 2015, 10 Pages.

(Continued)

*Primary Examiner* — Chris Parry
*Assistant Examiner* — Stephen Houlihan
(74) *Attorney, Agent, or Firm* — Micah Goldsmith; Sergey Lamansky; Micky Minhas

(57) ABSTRACT

Cooperative interaction of a message processor and an intermediation processor. The message processor processes messages received from a network and to be sent over a network. The intermediation processor intermediates between the message processor and the network using a shared memory that includes a memory portion that is within the address space of the message processor. The message processor writes messages into the memory portion over a physical channel and reads message from the memory portion over the physical channel. The intermediation processor provides messages received from a network into the memory portion so that the received messages can be read by the message processor over the physical channel. The intermediation processor dispatches messages written to the memory portion by the message processor over the network.

20 Claims, 4 Drawing Sheets

(56) References Cited

U.S. PATENT DOCUMENTS

2013/0145052 A1    6/2013    Aiken et al.
2014/0172939 A1*  6/2014    McSherry ............. G06F 9/4436
                                                              709/201

OTHER PUBLICATIONS

Otani, et al., "An 80Gb/s Dependable Communication SoC with PCI Express I/F and 8 CPUs", In IEEE International Solid-State Circuits Conference Digest of Technical Papers, Feb. 20, 2011, 3 pages.

Otani, et al., "Peach: A Multicore Communication System on Chip With PCI Express", In IEEE Micro, vol. 31, Issue 6, Nov. 2011, 12 pages.

"Synopsys IP for PCI Express 2.0 (Gen II) Passes PCI-SIG Compliance", Published on: Feb. 14, 2007, Available at: http://www.design-reuse.com/news/15254/synopsys-ip-pci-express-2-0-gen-ii-passes-pci-sig-compliance.html.

"Renesas Electronics Announces Development of a Communication SoC that Realizes 80Gbps Data Transfer Speed with PCI Express and Multicore CPUs", Published on: Feb. 24, 2011, Available at: http://www.renesas.com/press/news/2011/news20110224.jsp.

* cited by examiner

NETWORK COMMUNICATION USING INTERMEDIATION PROCESSOR

BACKGROUND

Computing systems have revolutionized the way people communicate, do business, and play. The driving force behind computing technology is the microprocessors, which are responsive to instructions (or software) that conforms to an instruction set. Modern microprocessors have a concept of an address space that corresponds to locations addressable by the microprocessor, and which may include memory that is within the microprocessor itself.

Microprocessors may communicate with other microprocessors and/or devices using a communication bus, such as a serial communication bus. One example of a serial communication bus is a Peripheral Component Interconnect (PCI) Express (sometimes called "PCIe") bus. The PCIe bus permits memory to be shared between devices. For instance, one connected device (a "first" device) may use memory within another connected device (a "second" device) so that some of the memory of the second device is within the address space of the first device. In other words, the first device treats the designated memory within the second device as its own, performing read and write operations over the PCIe bus itself using addresses that are within the address range(s) recognized as valid by the first device.

While some microprocessors may be general purpose, others might be specialized for one or more particular tasks. For instance, some microprocessors are designed to efficiently perform video encoding, others for digital signal processing, others for messaging over networks, and so forth.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein refer to a system that includes a message processor and an intermediation processor. The message processor processes messages received from a network and to be sent over a network. The intermediation processor intermediates between the message processor and the network using a shared memory that includes a memory portion that is within the address space of the message processor.

The message processor writes messages into the memory portion over a physical channel and reads message from the memory portion over the physical channel. The intermediation processor provides messages received from a network into the memory portion so that the received messages can be read by the message processor over the physical channel. The intermediation processor dispatches messages written to the memory portion by the message processor over the network.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein may be performed in a system that includes a message processor and an intermediation processor. The message processor processes messages received from a network and to be sent over a network. The intermediation processor intermediates between the message processor and the network using a shared memory that includes a memory portion that is within the address space of the message processor.

The message processor writes messages into the memory portion over a physical channel and reads message from the memory portion over the physical channel. The intermediation processor provides messages received from a network into the memory portion so that the received messages can be read by the message processor over the physical channel. The intermediation processor dispatches messages written to the memory portion by the message processor over the network.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
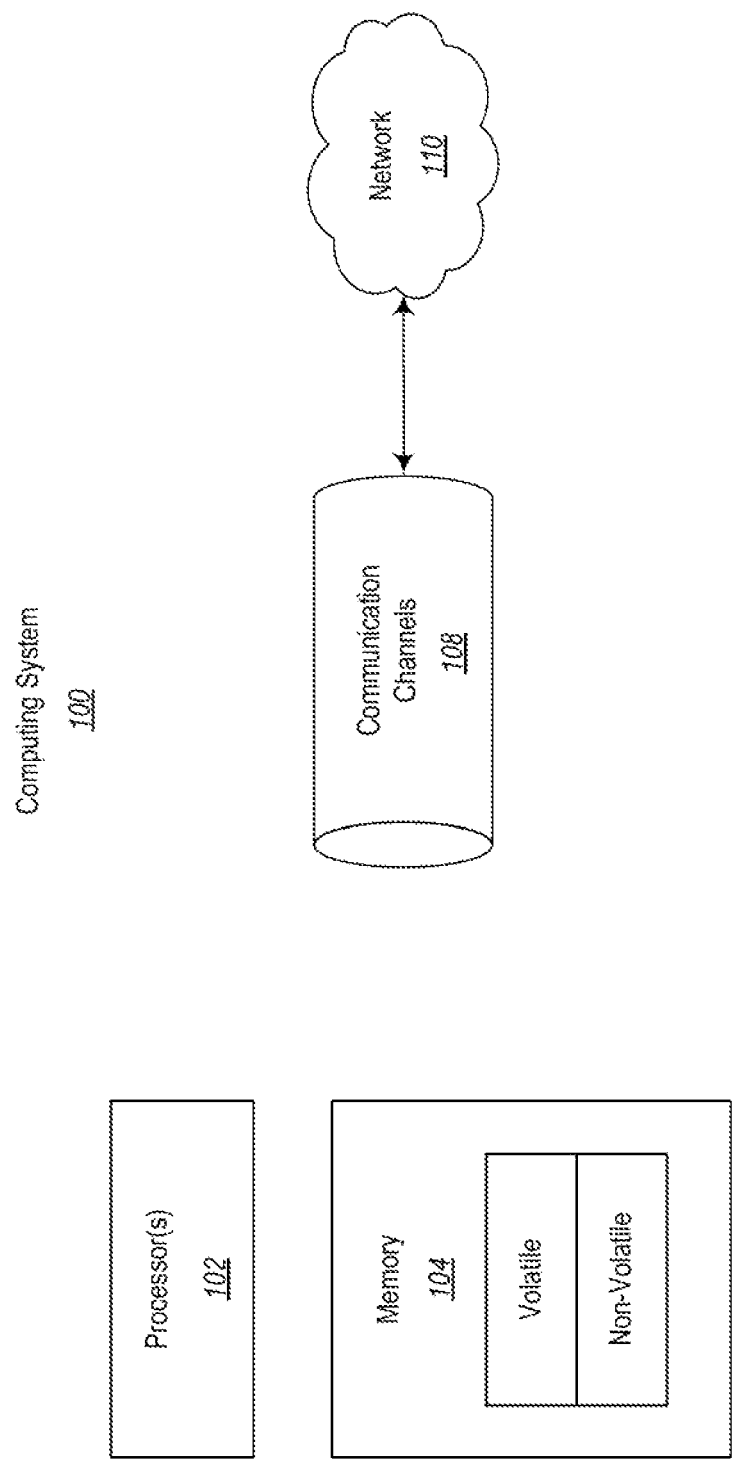
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
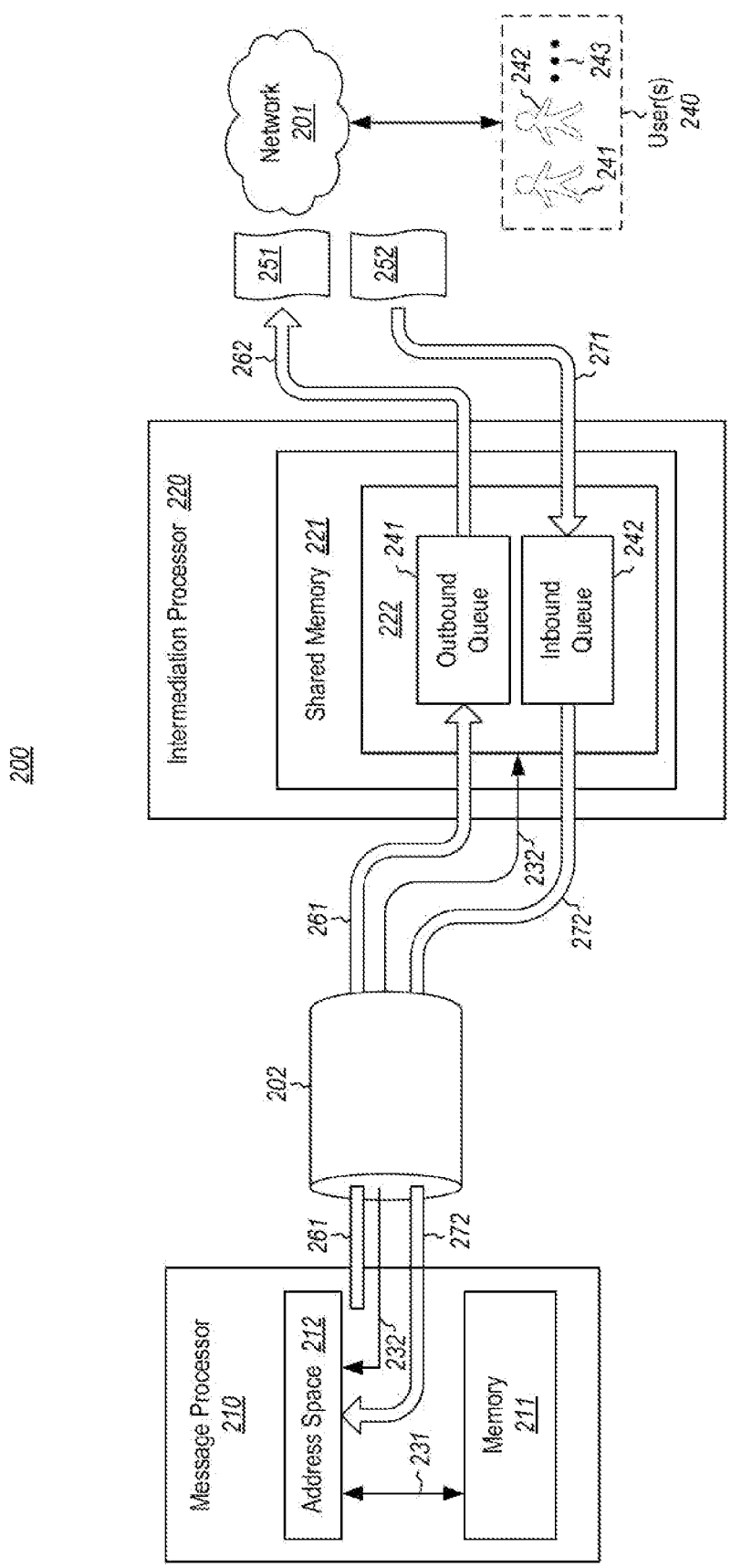
FIG. 2 illustrates an environment that includes a message processor that communicates with an intermediation processor over a physical channel.

FIG. 2 illustrates an environment 200 that includes a message processor 210 that communicates with an intermediation processor 220 over a physical channel 202. The environment 200 may be structured as described above for the computing system 100 of FIG. 1. For instance, message processor 210 and intermediation processor 220 are each examples of the processor unit(s) 102 of FIG. 1.

The message processor 210 processes messages received from a network 201, and messages to be sent over the network 201. An example of the network 201 is the Internet, although the network 201 might also be any other network or combinations of networks. An example of the physical channel 202 is a serial computer expansion bus, such as a Peripheral Component Interconnect (PCI) Express (sometimes referred to as "PCIe") protocol bus.

The intermediation processor 220 includes shared memory 221 that includes a memory portion 222 that is within the address space 212 of the message processor 210. For instance, the message processor 210 includes a concept of a valid range of addresses that may be addressed by the message processor 210 in its local memory 211. Some addresses of the valid range of addresses may in fact be mapped to address locations of the local memory 211 as represented by arrow 231. However, other addresses of the valid range of address may be mapped (as represented by arrow 232) to address locations within the memory portion 222 that is actually within the intermediation processor 220. From the viewpoint of logic running on the message processor 210, however, the addressing is the same. The message processor 210 may have caused the memory portion 222 to be within the address space of the message processor 210 using the physical channel 202. Some types of physical channels enable this type of shared memory mapping. For instance, the PCIe protocol permits high speed communication of data, and the use of shared memory.

As will be further described below, the message processor 210 sends outbound messages over the network 201 by writing the outbound messages into the memory portion 222 over the physical channel 202. The intermediation processor 220 is configured to dispatch messages written into the memory portion by the message processor 210. The intermediation processor 220 is configured to dispatch messages written by the message processor 210 over the network 201. The intermediation processor 220 may operate the memory portion as including an outbound first-in, first-out queue 241 (such as a ring buffer) of outbound messages.

The message processor 210 receives inbound messages from the network 201 by reading inbound messages from the memory portion 222 over the physical channel 202. The intermediation processor 220 is configured to provide inbound messages received from the network 201 into the memory portion 222 so that such inbound messages may be read by the message processor 210. The intermediation processor 220 may operate the memory portion also as including an inbound first-in, first-out queue 242 (such as a ring buffer) for inbound messages also.

If the intermediation processor 220 is able to keep up with the rate of deposit of outbound messages into the outbound queue 241, and the rate of deposit of inbound messages into the inbound queue 242, the latency of sending and receiving messages may be kept low even though the message processor 210 does not directly interface with the network 201. For instance, sending messages comprises a simple memory write operation over a fast physical channel 202 into outbound queue 241 in the intermediation processor 220, whereupon the intermediation processor 220 quickly sends the outbound message over the network 201. Receiving an inbound message comprises immediately placing the inbound message into the inbound queue 242 in the intermediation processor 220, whereupon the message processor 210 is notified and performs the read operation.

This low latency is important is some cases. For instance, consider a situation in which the message processor 210 is actually a game state processor operating remotely from users 240, who may be engaging in a game session. In fast paced games, a mere fraction of a second between the time the user actuates a control, and the time that the user perceives the results of that actuation in the game state, may be too long. In fact, some users are able to detect latencies as low as 70 milliseconds in such situations. When game state is being processed remotely, the network 201 itself will introduce some latency. Accordingly, in order to keep latency undetectable to most users, the receipt of messages by the message processor 210, the processing of the message by the message processing, and the providing of return messages by the message processor 210 should be kept as low as possible, potentially less than 10 milliseconds, or even just a few milliseconds or lower.

In FIG. 2, the users 240 are illustrated as including two users 241 and 242, although the ellipses 243 represents flexibility in the number of users. For instance, a game might even be single player or may involve users at a single location. Thus, the number of endpoints communicating with the environment 200 may be as few as one. On the other hand, the environment may be implementing a widespread game, involving numerous users at numerous locations.

Figure 3:
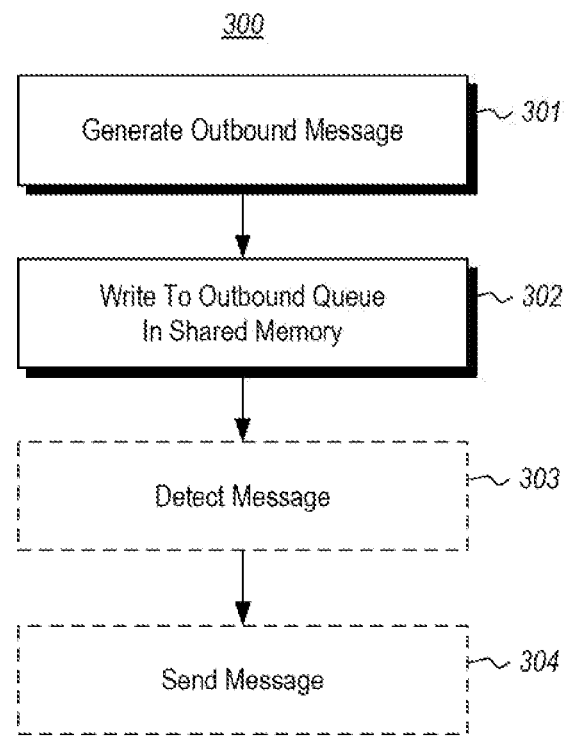
FIG. 3 illustrates a flowchart of a method for a message processor to send an outbound message over the network using an intermediation processor.
Figure 4:
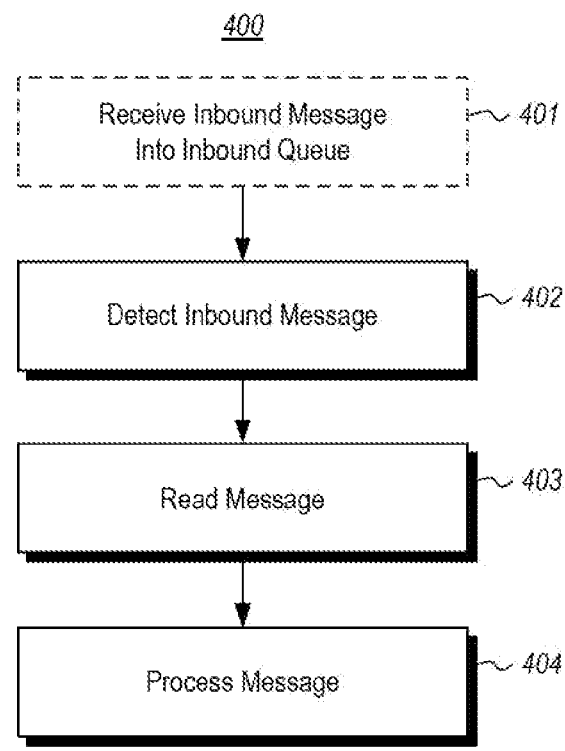
FIG. 4 illustrates a flowchart of a method for a message processor to receive an inbound message from the network using an intermediation processor.

FIG. 3 illustrates a flowchart of a method 300 for a message processor to send an outbound message over the network using an intermediation processor. FIG. 4 illustrates a flowchart of a method 400 for a message processor to receive an inbound message from the network using an intermediation processor. As the method 300 may be performed in the environment 200 when the message processor 210 sends an outgoing message, and as the method 400 may be performed in the environment 200 when the message processor 201 receives an ingoing message, the method 300 of FIG. 3, and the message 400 of FIG. 4, will now be described with frequent reference to the environment 200 of FIG. 2. Furthermore, some of the acts within the methods 300 and 400 are performed by a message processor as represented by the acts with solid-lined boxes. Others of the acts within the methods 300 and 400 are performed by the intermediation processor as represented by the acts within the dashed-line boxes.

Again, FIG. 3 illustrates a flowchart of a method 300 for a message processor to send an outbound message over the network using an intermediation processor. For instance, in the environment 200 of FIG. 2, the message processor 210 is to send an outgoing message 251 over the network 201, as represented by arrows 261 and 262.

The outbound message may be any suitable message. For instance, in the case in which the message processor 210 is a game state processor, the message may include audio associated with a current state of the game. The message might also be a haptic command, which causes the controller in the hands of the user to experience a tactile sensation, such as vibration. The message might also include video associated with a current state of the game. The intermediation processor 220 might even be a video encoder that provides video information over the network 201. The video information may be generated by the intermediation processor 220, or might be provided by the message processor 210 or another processor (not shown) to the intermediation processor 220 acting as a video encoder. An example of such a configuration is illustrated below with respect to FIG. 5. In any case, the outbound message may be tagged within information identifying the type of data contained by the outbound message.

According to the method 300, the message processor first generates an outbound message (act 301). For instance, in FIG. 2, the message processor generates outbound message 251.

The message processor writes the outbound message to a memory portion within the shared memory of the intermediation processor using a physical channel (act 302) that allows the memory portion within the intermediation processor to be within an address space of the message processor. For instance, in FIG. 2, the message processor 210 writes the message 251 to the outbound queue 241 within the memory portion 222 as represented by arrow 261. Although not required, there may be multiple outbound queues depending on the data type, thus allowing the queue to be optimized for that particular data type, and thereby reduce latency. For instance, there might be an outbound queue for audio data, another outbound queue for haptic commands, yet another outbound queue might be for chat information, and so forth.

The intermediation processor then detects the outbound message written into the memory portion (act 303). For instance, in FIG. 2, the intermediation processor 220 implements the outbound queue 241 as a first-in, first-out queue, and operates faster, on average, that the outgoing messages are placed into the outbound queue 241. Accordingly, the intermediation processor 220 quickly detects the outbound message 251 written into the outbound queue 241.

In response, the intermediation processor dispatches the outbound message from the memory portion over the network (act 304). For instance, in the context of FIG. 2, the intermediation processor 220 dispatches the outbound message 251 over the network 201 as represented by the arrow 262.

FIG. 4 illustrates a flowchart of a method 400 for receiving an inbound message from a network. The intermediation processor receives an inbound message from the network into the memory portion that is within the addressable space of the message processor (act 401). For instance, in FIG. 2, the intermediation processor 220 receives an inbound message 252 into the inbound queue 242 as represented by arrow 271.

The message processor then detects the inbound message in the memory portion (act 402). For instance, the intermediation processor 220 may implement the inbound queue 242 as a first-in, first-out queue, and be able to process inbound messages on average faster than inbound messages are placed into the inbound queue. Accordingly, the message processor 210 detects the presence of the inbound message. This detection mechanism may occur in any number of ways. In one way, the intermediation processor 220 actually notifies the message processor 210 of the presence of an inbound message. Alternatively or in addition, the message processor 210 may periodically poll the intermediation processor 220 for inbound messages.

In response, the message processor reads the inbound message from the memory portion (act 403). In FIG. 2, for example, the message processor 210 may read the inbound message 252 from the inbound queue 242 using the physical channel 202 as represented by arrow 272. This may be a normal read operation for the message processor 210 as the memory portion 222 is within the address space 212 of the message processor 210.

The message processor then processes the inbound message (act 404). For instance, the message processor 210 may then process the inbound message 242.

In the example in which the message processor is a game state processor, the inbound message may be game input including, for example, voice data. For instance, one user 240 might chat with another user 240. The inbound message might also be game controller input commands indicating which button or actuator of the controller has been activated and in what matter. The inbound message might alternatively be a system command or notification, such as a notification that the user is no longer active in the game, or has disconnected from the game. In any case, the inbound message may be tagged within information identifying the type of data contained by the inbound message. There may alternatively be multiple inbound queues, each dedicated for a different type of incoming message (e.g., chat, controller commands, notifications, system commands, and so forth).

Figure 5:
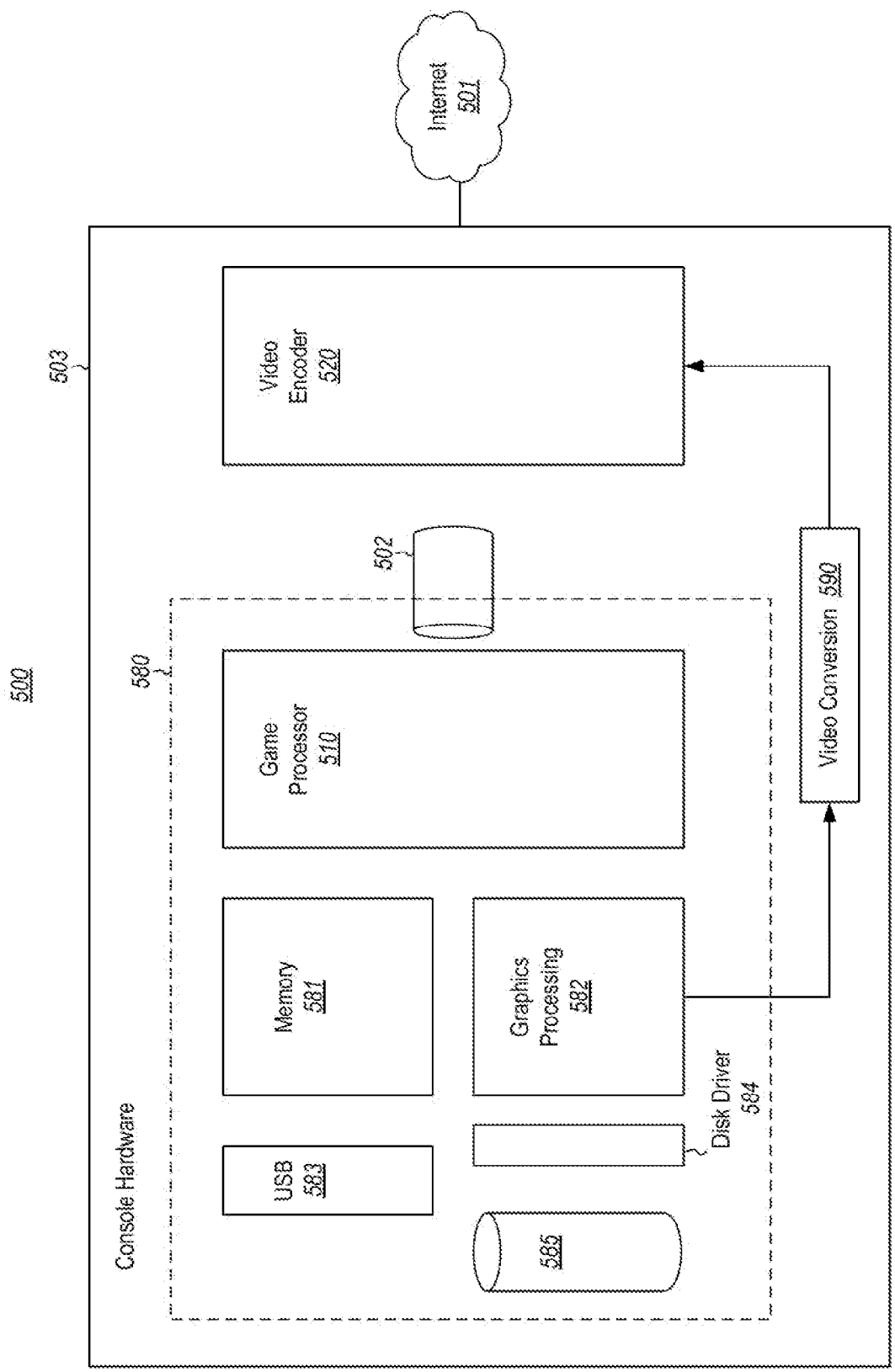
FIG. 5 illustrates a system that represents an example of the environment of FIG. 2.

FIG. 5 illustrates a system 500 that represents an example of the environment 200 of FIG. 2. The system 500 includes a server blade 503 that is connected to the Internet 501. The video encoder 520 has the most direct connection to the Internet and is an example of the intermediation processor 220 of FIG. 2.

The server blade 503 also includes console electronics 580. The console electronics includes a game processor 510, which is an example of the message processor 210 of FIG. 2. The game processor 510 provides outgoing messages in the form of game audio, tactic commands, and so forth over the physical channel 502 to the video encoder 520 for dispatch over the Internet 501. Likewise, the game processor 510 receives controller (or game state input) commands, voice data, system commands, and so forth from the Internet 501 via the intermediation processor 520. The Internet 501 is an example of the network 201 of FIG. 2. The physical channel 502 is an example of the physical channel 202 of FIG. 2.

The console hardware 580 further includes a graphics processor 582 that provides video in a first format to a video conversion module 590. The video conversion module 590 provides the video in a compatible form for the video encoder 520. The video encoder 520 then provides the video over the Internet 520 to the user(s) of the game. All of the messages, video, audio, tactic commands, voice, system commands, and the like, may have a timestamp (e.g., a relative timestamp), so that the video encoder 520 sends out synchronized video, audio, and other messages.

The console hardware 580 also includes memory 581, which is external to the game processor 510, a Universal Serial Bus 583, a disk driver 584, and a storage 585. In some embodiments, the console hardware is the same as that included within a console that may be present locally before the game user. In this manner, the game user may have a similar experience, with low latency, as the game user would have regardless of whether the game state is processed remotely on the console hardware 580, or locally via a local game console.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for a hardware-based game state processor to communicate using a hardware-based video encoder that is connected to a network, the method comprising:
    the hardware-based game state processor writing an outbound message to a memory portion within a shared memory of the hardware-based video encoder using a physical channel that physically connects the game state processor and the video encoder and that allows the memory portion within the video encoder to be within an address space of the game state processor, the outbound message for dispatch over the network and comprising video game output, including at least one of audio, a haptic command, and video;
    the video encoder detecting the outbound message written in the memory portion;
    in response to detecting the outbound message, the video encoder dispatching the outbound message from the memory portion over the network;
    the video encoder receiving an inbound message from the network into the memory portion;
    the game state processor detecting the inbound message in the memory portion, the inbound message comprising video game input, including at least one of voice data, a game controller input, and a system command; and
    in response to detecting the inbound message, the message processor reading the inbound message from the memory portion using the physical channel.

2. The method in accordance with claim 1, the physical channel being a serial bus.

3. The method in accordance with claim 1, the physical channel being a serial computer expansion bus.

4. The method in accordance with claim 1, the network being the Internet.

5. The method in accordance with claim 1, the game state processor writing the outbound message into an outbound queue in the memory portion, and the video encoder receiving the inbound message into an inbound queue in the memory portion.

6. The method in accordance with claim 5, at least one of the outbound queue and the inbound queue comprising a plurality of queues that each store a different type of message.

7. The method in accordance with claim 1, the game state processor detecting the inbound message in the memory portion based on at least one of the video encoder notifying the game state processor of the presence of the inbound message and the game state processor polling the video encoder for incoming messages.

8. The method in accordance with claim 1, at least one of the outbound message and the inbound message being tagged with information indicating a type of data contained in the message.

9. The method in accordance with claim 1, the outbound message comprising a timestamp, and the video encoder dispatching synchronized outbound messages over the network based on the timestamp.

10. The method in accordance with claim 1, the video encoder being capable of dispatching outgoing messages over the network faster than the game state processor is capable of writing the outbound messages to the memory portion.

11. A computer system, comprising:
    a hardware-based game state processor;
    a hardware-based video encoder comprising a shared memory;
    a physical channel physically connecting the game state processor and the video encoder, the physical channel allowing a memory portion of the shared memory within the video encoder to be within an address space of the game state processor;
    a network interface connected to the video encoder; and
    one or more computer-readable media comprising computer-executable instructions that are executable by one or more processors to cause the game state processor and the video encoder to perform at least the following:
        write, by the game state processor, an outbound message to the memory portion within the shared memory of the video encoder using the physical channel, the outbound message for dispatch over the network interface and comprising video game output, including at least one of audio, a haptic command, and video;
        detect, by the video encoder, the outbound message written in the memory portion;
        in response to detecting the outbound message, dispatch, by the video encoder, the outbound message from the memory portion over the network interface;
        receive, by the video encoder, an inbound message from the network interface into the memory portion;
        detect, by the game state processor, the inbound message in the memory portion, the inbound message comprising video game input, including at least one of voice data, a game controller input, and a system command; and
        in response to detecting the inbound message, read, by the message processor, the inbound message from the memory portion using the physical channel.

12. The computer system in accordance with claim 11, the physical channel being a serial bus.

13. The computer system in accordance with claim 11, the physical channel being a serial computer expansion bus.

14. The computer system in accordance with claim 11, the computer-executable instructions being executable to cause the game state processor to write the outbound message into an outbound queue in the memory portion, and to cause the video encoder to receive the inbound message into an inbound queue in the memory portion.

15. The computer system in accordance with claim 14, at least one of the outbound queue and the inbound queue comprising a plurality of queues that each store a different type of message.

16. The computer system in accordance with claim 11, game state processor being configured to detect the inbound message in the memory portion based on at least one of the video encoder notifying the game state processor of the presence of the inbound message and the game state processor polling the video encoder for incoming messages.

17. The computer system in accordance with claim 11, at least one of the outbound message and the inbound message being tagged with information indicating a type of data contained in the message.

18. The computer system in accordance with claim 11, the outbound message comprising a timestamp, and the video encoder being configured to dispatch synchronized outbound messages over the network based on the timestamp.

19. The computer system in accordance with claim 11, the video encoder being capable of dispatching outgoing messages over the network faster than the game state processor is capable of writing the outbound messages to the memory portion.

20. A computer program product comprising one or more hardware storage devices having stored thereon computer-executable instructions that are executable by one or more processors to cause a hardware based game state processor to communicate using a hardware video encoder that is connected to a network, the computer-executable instructions in including instruction that are executable to cause the game state processor and the video encoder to perform at least the following:

write, by the hardware based game state processor, an outbound message to a memory portion within a shared memory of the hardware based video encoder using a physical channel that physically connects the game state processor and the video encoder and that allows the memory portion within the video encoder to be within an address space of the game state processor, the outbound message for dispatch over the network and comprising video game output, including at least one of audio, a haptic command, and video;

detect, by the video encoder, the outbound message written in the memory portion;

in response to detecting the outbound message, dispatch, by the video encoder, the outbound message from the memory portion over the network;

receive, by the video encoder, an inbound message from the network into the memory portion;

detect, by the game state processor, the inbound message in the memory portion, the inbound message comprising video game input, including at least one of voice data, a game controller input, and a system command; and in response to detecting the inbound message, read, by the message processor, the inbound message from the memory portion using the physical channel.

* * * * *